United States Patent
Kaneko et al.

[11] Patent Number: 6,144,761
[45] Date of Patent: *Nov. 7, 2000

[54] PHOTOGRAMMETRIC ANALYTICAL MEASUREMENT SYSTEM

[75] Inventors: Atsumi Kaneko, Tokyo; Atsushi Kida; Toshihiro Nakayama, both of Saitama ken, all of Japan

[73] Assignee: Asahi Kogaku Kogyo Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/017,237

[22] Filed: Feb. 2, 1998

[30] Foreign Application Priority Data

Feb. 3, 1997 [JP] Japan .................... 9-034330

[51] Int. Cl.[7] .................................................. G06K 9/00
[52] U.S. Cl. ........................ 382/154; 382/285; 382/286
[58] Field of Search .............................. 382/154, 285, 382/286, 209, 151, 106; 348/42, 47, 48; 364/508

[56] References Cited

U.S. PATENT DOCUMENTS 5,642,293  6/1997  Manthey et al. ........................ 364/508
5,699,444  12/1997  Palm ........................................ 382/106
5,870,490  2/1999  Takahashi et al. ..................... 382/154

FOREIGN PATENT DOCUMENTS 8233527  9/1996  Japan .
8241410  9/1996  Japan .

*Primary Examiner*—Amelia Au
*Assistant Examiner*—Vikkram Bali
*Attorney, Agent, or Firm*—Greenblum & Bernstein, P.L.C.

[57] ABSTRACT

In a photogrammetric analytical measurement system, a survey map is produced on the basis of two respective photographed pictures obtained at two different photographing positions. Each of the pictures includes an object image to be recorded on the survey map, and a standard measurement scale image for producing an accurately scaled object image. Data for producing the survey map is approximately calculated on the basis of two-dimensional position data inputted to the computer by designating the scale image and the object image on the pictures with a cursor, by an operator's manipulation of a mouse. When the results of the approximate calculations are erroneous, it is indicated that the inputting of the two-dimensional position data, by designation of the object image with the cursor, should be repeated.

20 Claims, 12 Drawing Sheets

PHOTOGRAMMETRIC ANALYTICAL MEASUREMENT SYSTEM

BACKGROUND OF THE INVENTION

1. Field of the Invention

This invention relates to a photogrammetric analytical measurement system, in which a survey map is produced on the basis of a set of photographed pictures obtained at two different photographing positions.

2. Description of the Related Art

For example, photogrammetry is carried out at a traffic accident spot. The traffic accident spot is photographed by a camera in at least two different positions, and a survey map of the traffic accident spot is produced based on a set of photographed pictures obtained at the different positions.

In particular, a two-dimensional coordinate system is defined on each of the photographed pictures, and two-dimensional positions of the objects, which are recorded on each picture, are determined by the two-dimensional coordinate system. Then, a three-dimensional coordinate system is defined on the basis of the two sets of two-dimensional coordinate systems, and three-dimensional positions of the recorded objects are determined from the three-dimensional coordinate system. Accordingly, it is possible to produce a survey map of the traffic accident spot by drawing the objects on a sheet of paper in such a manner that the objects are projected on one of the three planes defined by the three-dimensional system.

Before accurately scaled distances and lengths can be reproduced on the survey map, a standard measurement scale must be recorded together with the objects in the photographed pictures. Also, a standard reference plane, on which the survey map should be drawn, must be defined in the photographed pictures.

Usually, in order to define the standard measurement scale and the reference plane, three respective cone-shaped markers, which are identical to each other, are positioned at suitable locations around a traffic accident spot. Namely, a distance between two apexes of the cone-shaped markers is measured, for example, with a measuring tape, and set as the standard measurement scale, and a plane, defined by the three apexes of the cone-shaped markers, is utilized as the reference plane.

The determination of the three-dimensional positions of the recorded objects from the three-dimensional coordinate system is carried out by iterating a series of approximate calculations, using a computer having a monitor on which the set of photographed pictures is displayed.

Initially, before a first series of approximate calculations is executed, the apexes of the cone-shaped markers and a suitable point on one of the recorded objects in the set of photographed pictures displayed on the monitor are selected with a cursor, by manipulating a mouse, whereby three sets of two-dimensional coordinates, corresponding to the apexes of the cone-shaped markers, and a set of two-dimensional coordinates on the suitable point of the selected object are inputted to the computer. Namely, the execution of the first series of approximate calculations is based upon the inputted two-dimensional coordinates of the apexes of the cone-shaped markers and the inputted two-dimensional coordinates of the suitable point on the selected object, thereby determining three-dimensional positions of the apexes of the cone-shaped markers and a three-dimensional position of the suitable point of the selected object from the three-dimensional coordinate system.

Then, another suitable point on the selected object in the set of photographed pictures displayed on the monitor is indicated with the cursor, by manipulating the mouse, whereby a set of two-dimensional coordinates of the other suitable point on the selected object is inputted to the computer, and a second series of approximate calculations is executed on the basis of the inputted two-dimensional coordinates of the other suitable point on the selected object, thereby determining a three-dimensional position of the other suitable point on the selected object from the three-dimensional coordinate system. This procedure is continued until a sufficient number of points on the selected object are indicated, to thereby specify a three-dimensional profile of the selected object.

Before the three-dimensional profile of the selected object can be properly specified and produced, each of the suitable points on the selected object must be precisely indicated with the cursor, by an operator's manipulation of the mouse. Nevertheless, the indication of the suitable points on the selected object with the cursor, by the operator's manipulation of the mouse, cannot always be carried out in a precise manner. Of course, unless the precise indication of the suitable points on the selected object can be ensured, the selected object cannot be accurately drawn on the survey map. Note, it is possible to precisely indicate the apexes of the cone-shaped markers with the cursor, by the operator's manipulation of the mouse, because the apex of each cone-shaped marker is very conspicuous.

SUMMARY OF THE INVENTION

Therefore, an object of the present invention is to provide a photogrammetric analytical measurement system, as mentioned above, in which a precise indication of suitable points on an selected object with a cursor, by an operator's manipulation of a mouse, can always be ensured.

In accordance with an aspect of the present invention, there is provided a photogrammetric analytical measurement system for producing a survey map on the basis of respective first and second photographed pictures obtained at two different photographing positions, each of the first and second pictures including an object image to be recorded on the survey map, and a standard measurement scale image for producing an accurately scaled object image. The system comprises: a monitor for displaying the first and second pictures; a designator for manually designating a two-dimensional position on the first and second pictures, displayed on the monitor; a retriever for retrieving, as a set of two-dimensional position data, a first two-dimensional position, designated on the first picture by the designator, and a second two-dimensional position, designated on the second picture by the designator; a first calculator for approximately calculating three-dimensional position data of the standard measurement scale image and the object image on the basis of plural sets of two-dimensional position data, retrieved by the retriever, corresponding to the standard measurement scale image and the object image designated by the designator; a second calculator for calculating a dimensional parameter of the standard measurement scale image on the basis of the three-dimensional coordinate position data of the standard measurement scale image; a converter for converting the dimensional parameter of the standard measurement scale image into an estimated actual dimensional parameter, on the basis of a known actual dimensional parameter of the standard measurement scale image; and a determiner for determining whether or not a difference between the estimated actual dimensional parameter and the known actual dimensional parameter falls in a predetermined permissible range.

The system may further comprises an indicator for warning that designation of the respective first and second two-dimensional positions, corresponding to the object image, by the designator should be repeated, when it is determined by the determiner that the difference between the estimated actual dimensional parameter and the known actual dimensional parameter does not fall in the predetermined permissible range. The indicator may comprise a part of a display area of the monitor, on which a warning message can be displayed.

In accordance with another aspect of the present invention, there is provided a photogrammetric analytical measurement method of producing a survey map on the basis of respective first and second photographed pictures obtained at two different photographing positions, each of the first and second pictures including an object image to be recorded on the survey map and a standard measurement scale image for producing a proper relative size of the object image. The method comprises steps of: displaying the first and second pictures on a monitor; designating a two-dimensional position on the first and second pictures displayed on the monitor, using a manual designator; retrieving, as a set of two-dimensional position data, a first two-dimensional position, designated on the first picture by the designator, and a second two-dimensional position, designated on the second picture by the designator; performing approximate calculation to determine three-dimensional position data of the standard measurement scale image and the object image on the basis of plural sets of two-dimensional position data, retrieved by the retriever, corresponding to the standard measurement scale image and the object image, designated by the designator; performing calculation to determine a dimensional parameter of the standard measurement scale image on the basis of the three-dimensional coordinate position data of the standard measurement scale image; converting the dimensional parameter of the standard measurement scale image into an estimated actual dimensional parameter on the basis of a known actual dimensional parameter of the standard measurement scale image; and determining whether or not a difference between the estimated actual dimensional parameter and the known actual dimensional parameter falls in a predetermined permissible range.

The method may further comprises the step of warning that designation of the respective first and second two-dimensional positions, corresponding to the object image, by the designator should be repeated when determining that the difference between the estimated actual dimensional parameter and the known actual dimensional parameter does not fall in the predetermined permissible range. A warning message may be displayed on a part of a display area of the monitor.

The dimensional parameter may be defined as a length derived from the standard measurement scale image. In this case, the standard measurement scale image may have at least two conspicuous reference points, and the length may be defined as a distance between the two conspicuous reference points of the standard measurement scale image.

The standard measurement scale image may have at least three conspicuous reference points, and at least one of the distances between the conspicuous reference points is a known standard dimensional parameter. The conspicuous reference points may define an equilateral triangle. Also, the conspicuous reference points may define a triangular reference plane on which the survey map is to be produced. When the triangular reference plane is inclined with respect to a horizontal plane of the Earth, the approximate calculation should be executed by the first calculator, taking into consideration the three-dimensional angular position of a camera at the two photographing locations.

An execution of the approximate calculation by the first calculator is preferably based upon five sets of two-dimensional position data, retrieved by the retriever, corresponding to the standard measurement scale image and the object image.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
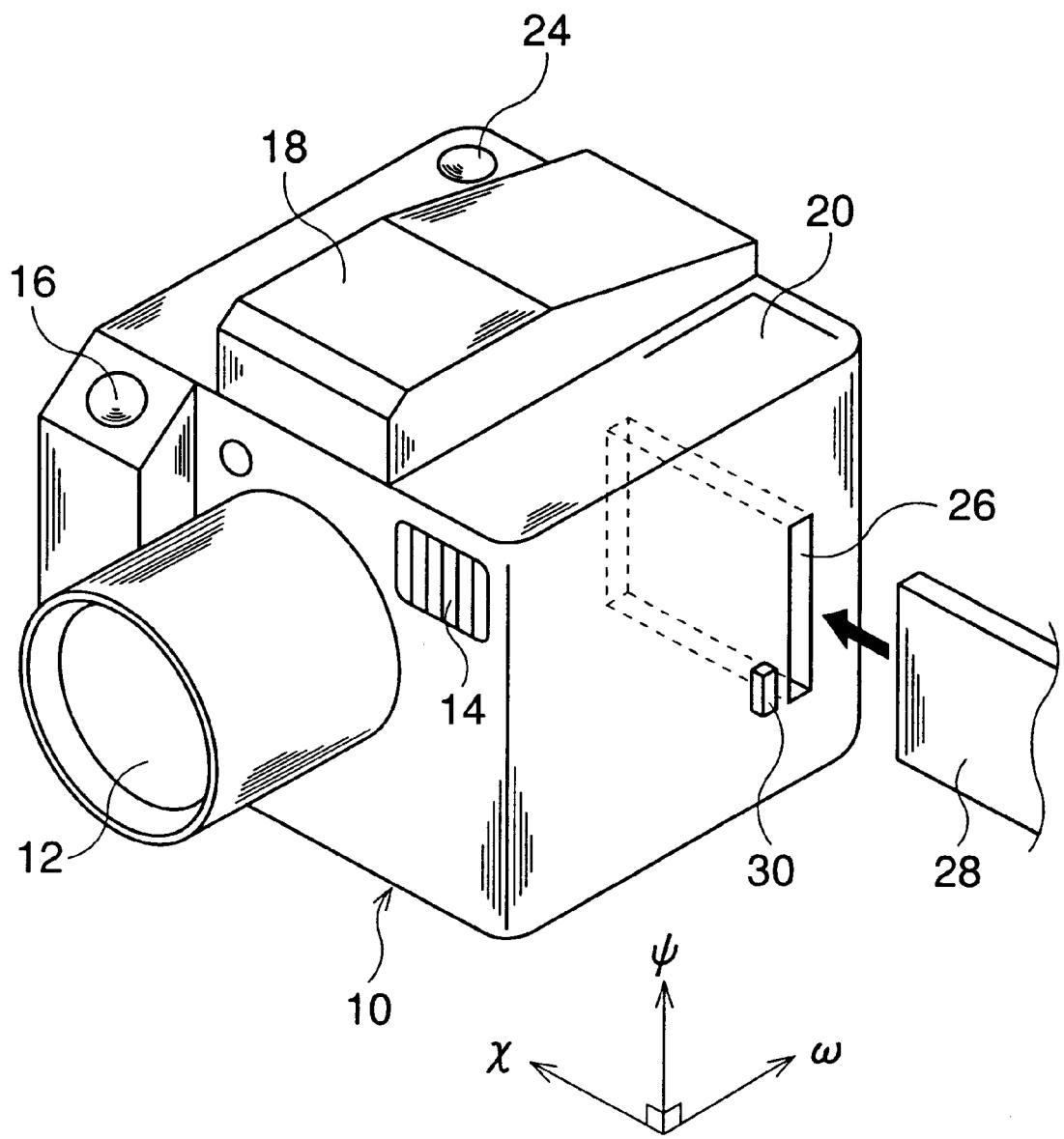
FIG. 1 is a schematic perspective view showing an appearance of an electronic still video camera used in a photogrammetric analytical measurement system, according to the present invention.

FIG. 1 is an external view of an electronic still video camera, which may be used in a photogrammetric analytical measurement system. The camera comprises: a camera body 10; a photographing optical system 12 provided at an approximately central location on a front surface of the camera body 10; an electronic flash 14 disposed on the front surface of the camera body 10, above and to the right side of the photographing optical system 12; and a release switch button 16 provided on the front, on a side opposite to the electronic flash 14, relative to the photographing optical system 12.

Also, the camera is provided with a view finder 18, provided centrally on the top surface of the camera body 10, an LCD (liquid crystal display) panel 20 provided on the top surface, to one side of the view finder 18, and a power switch button 24 provided on the other side of the view finder 18. Further, the camera body 10 has an elongated slot 26 formed in a side wall thereof, and a recording medium 28, such as an IC memory card, is loaded into and unloaded from the camera through the elongated slot 26. Note, in FIG. 1, reference numeral 30 indicates a button for unloading the IC memory card 28 from the camera by ejection through the elongated slot 26.

Note, although not visible in FIG. 1, an LCD-type monitor (indicated by reference 62 in FIG. 2) is incorporated in a rear wall of the camera body 10, and a photographed image can be reproduced and observed on the monitor.

Figure 2:
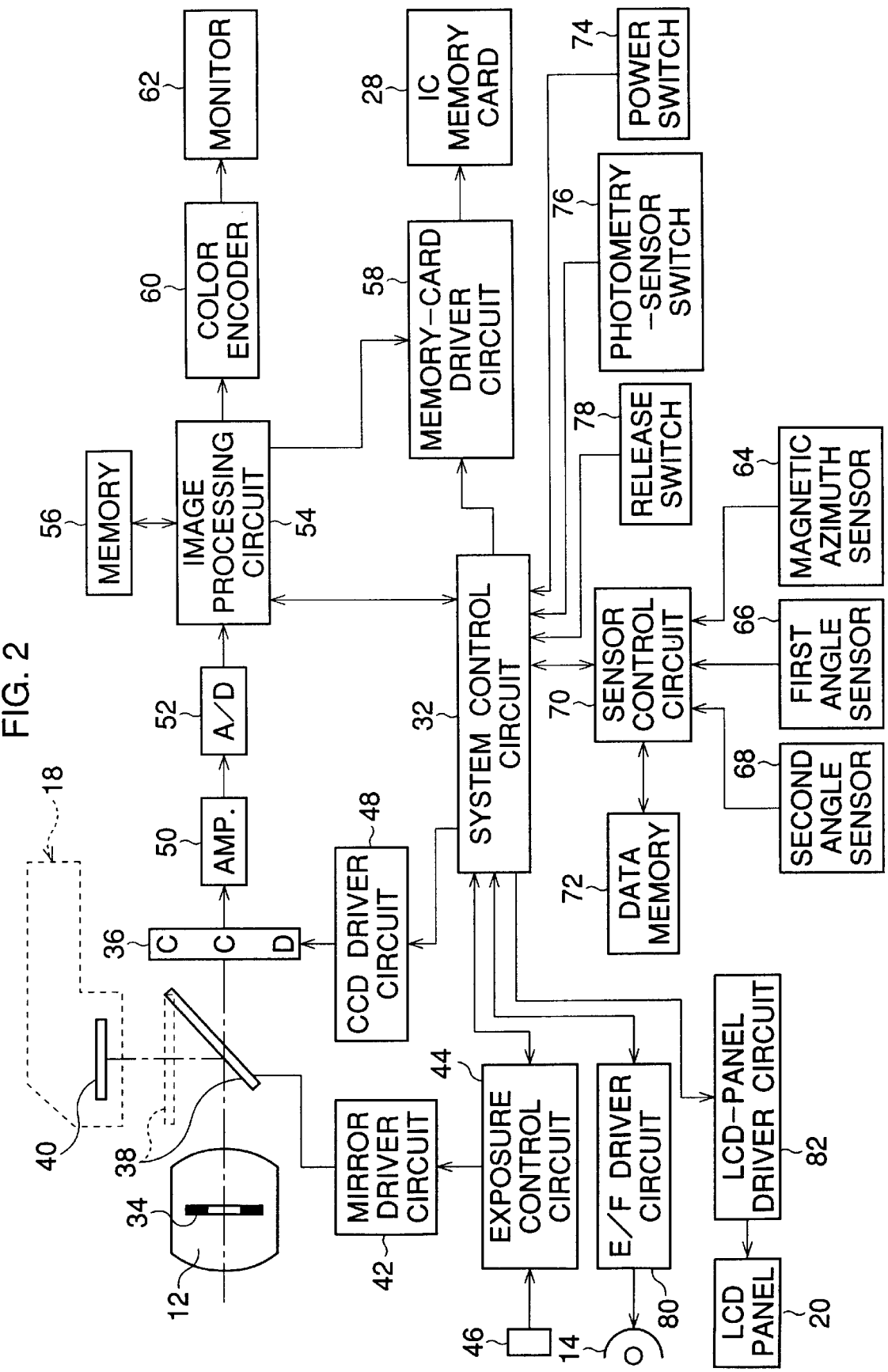
FIG. 2 is a block diagram of the electronic still video camera shown in FIG. 1.

FIG. 2 shows a block diagram of the camera according to the present invention. In this block diagram, reference 32 indicates a system control circuit, which includes a microcomputer or microprocessor, a read-only memory (ROM), a random-access-memory (RAM), etc., used to control the camera as a whole.

The photographing optical system 12 comprises a plurality of lens groups and an aperture or diaphragm 34 incorporated therein. A solid area image sensor 36, disposed behind the photographing optical system 12, serves as a photoelectric-conversion device. Preferably, the solid area image sensor 36 is constituted as a CCD (charge-coupled device) area image sensor. A quick return mirror 38 is placed between the photographing optical system 12 and the CCD image sensor 36, and a focusing glass 40, included in a view finder optical system of the view finder 18, is disposed above the quick return mirror 38.

The quick return mirror 38 is driven by a mirror driver circuit 42, so as to be moved between a down-position (i.e. the inclined position shown by the solid lines in FIG. 2) and an up-position (i.e. the horizontal position shown by the broken lines in FIG. 2). The mirror driver circuit 42 is controlled by an exposure control circuit 44, having a photometry sensor 46 connected thereto, which is operated under control of the system control circuit 32 based on an output signal of the photometry sensor 46.

The quick return mirror 38 is usually in the down-position or the inclined position, and thus light beams, passing through the photographing optical system 12, are directed to the optical system of the viewfinder 18, so that an object to be photographed can be observed through the viewfinder 18 by a photographer. When a photographing operation is executed, the quick return mirror 38 is rotated upward by the mirror driver circuit 42, being then in the up-position, so that the light beams, passing through the photographing optical system 12, are directed to a light-receiving area of the CCD area image sensor 36. Namely, due to the photographing optical system 12, an optical image is formed on the light-receiving area of the CCD area image sensor 36.

Note, although not shown in FIG. 2, an iris driver circuit is provided to drive the diaphragm 34, and is controlled by the exposure control circuit 44.

The CCD area image sensor 36 has an electronic shutter function, whereby a time of exposure (i.e. a time of electric charge accumulation) is regulated by the electronic shutter function of the CCD area image sensor 36 based on an output signal of the photometry sensor 46. After the time of exposure has elapsed, the quick return mirror 38 is returned from the up-position to the down-position. During the time of exposure, the CCD area image sensor 36 converts the optical image into electrical pixel signals. The converted electrical pixel signals are read out from the CCD area image sensor 36 by a CCD driver circuit 48, which is operated under control of the system control circuit 32.

The pixel signals read out of the CCD area image sensor 36 are amplified by an amplifier 50, and are then converted to digital pixel signals by an analog-to-digital (A/D) converter 52. The digital pixel signals are subjected to a shading correction, a gamma correction, and so on by an image-processing circuit 54, under control of the system control circuit 32, and are then temporarily stored in a memory 56, having a capacity for storing a frame of digital pixel signals outputted from the CCD area image sensor 36.

The pixel signals outputted from the memory 56 are fed to a memory-card driver circuit 58, by which the fed pixel signals are stored as a frame of pixel data in the IC memory card 28. Also, the frame of pixel signals may be outputted from the memory 56 into a color encoder 60, which produces a color video signal on the basis of the frame of pixel signals, the color video signal then being fed to an LCD-type monitor 62, on which the photographed image is reproduced and observed. Note, as mentioned above, the LCD-type monitor 62 is provided in the rear wall of the camera body 10.

The camera is provided with an angle-detecting system, for detecting a relative angular-movement of the camera, which includes a magnetic azimuth sensor 64, a first rotational-angle sensor 66, and a second rotational-angle sensor 68. These sensors 64, 66 and 68 are connected to the system control circuit 32 through the intermediary of a sensor control circuit 70, which includes a microcomputer or microprocessor, a read-only memory (ROM), a random-access-memory (RAM), etc., used to control the sensors 64, 66 and 68.

The position-detecting system (64, 66 and 68) is associated with a $\chi$-$\psi$-$\omega$ three-dimensional coordinate system as shown in FIG. 1. Although, for the sake of convenience of illustration, the $\chi$-$\psi$-$\omega$ three-dimensional coordinate system is separated from the camera, this three-dimensional coordinate system is preferably defined in the camera such that an origin of the coordinate system is situated at a back principal point of the photographing optical system 12 of the camera. A $\psi$-axis of the $\chi$-$\psi$-$\omega$ three-dimensional coordinate system extends vertically with respect to the Earth, and the remaining $\chi$- and $\omega$-axes extend horizontally from the origin so as to be perpendicular to each other.

The magnetic azimuth sensor 64 detects angular-movement data of the camera around the $\psi$-axis of the $\chi$-$\psi$-$\omega$ three-dimensional coordinate system. Namely, by using the magnetic azimuth sensor 64, the angular-movement data of the camera around the $\psi$-axis is detected as absolute angle data with respect to a direction defined by a terrestrial magnetism. The first and second rotational-angle sensors 66 and 68 detect angular-movement data of the camera around the respective $\chi$- and $\omega$-axes of the $\chi$-$\psi$-$\omega$ three-dimensional coordinate system. The sensor control circuit 70 calculates three-dimensional angular data of the camera based on the three-dimensional angular-movement data detected by the sensors 64, 66 and 68. In short, the three-dimensional angles of the optical axis of the photographing optical system 12 of the camera are detected by the sensors 64, 66 and 68 with respect to the vertical axis or ψ-axis of the χ-ψ-ω three-dimensional coordinate system.

The sensor control circuit 70 is operated under control of the system control circuit 32, and drives each of the sensors 64, 66 and 68. The sensor control circuit 70 is provided with a data-memory 72, which temporarily stores the three-dimensional angular data, derived from the sensors 64, 66 and 68.

Each of the sensors 64, 66 and 68 should ideally be arranged in the camera so as to be located at the origin of the χ-ψ-ω three-dimensional coordinate system, i.e. at the back principal point of the photographing optical system 12 of the camera, but the arrangement of each sensor at the back principal point of the optical system 12 is, in reality, impossible.

Accordingly, each of the sensors 64, 66 and 68 must be arranged so as to be offset from the back principal point of the photographing optical system 12, and thus the three-dimensional angular data and the three-dimensional positional data must be corrected in accordance with offset-distance data, which is preprogrammed on the basis of respective offset distances of the sensors from the back principal point of the optical system 12. The data-memory 72 is also used to store the offset-distance data.

As shown in FIG. 2, the camera is provided with a power switch 74, which is associated with the power switch button 24, such that the power switch 74 is powered ON or OFF by depressing the power switch button 24, a photometry-sensor switch 76 and a release switch 78, both being associated with the release switch button 16 (FIG. 1). In particular, when the release switch button 16 is half depressed, the photometry-sensor switch 76 is turned ON, and, when the release switch button 16 is fully depressed, the release switch 78 is turned ON. Note, the power switch 74 and the release switch 78 are associated with the sensor control circuit 70 for driving the sensors 64, 66 and 68, as explained in detail hereinafter.

Further, as shown in FIG. 2, the electronic flash 14 is electrically energized by an electronic flash driver circuit 80, operated under control of the system control circuit 32. The electrical energization of the electronic flash 14 is carried out as soon as the release switch button 16 is fully depressed, if necessary. Also, the LCD panel 20 is connected to the system control circuit 32, through an LCD-panel driver circuit 82, to display various setting conditions of the camera, suitable messages, and so on.

Figure 3:
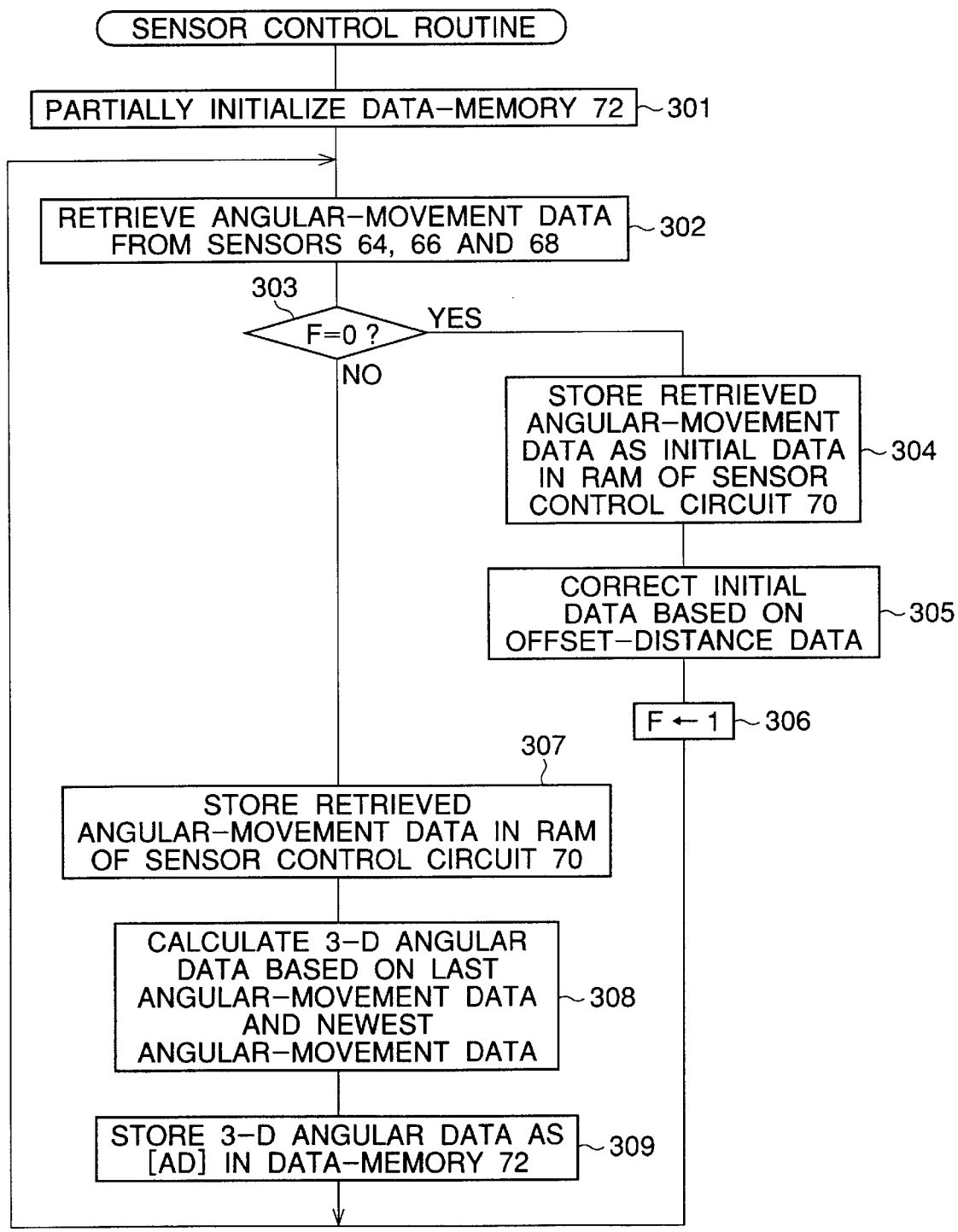
FIG. 3 is a flowchart of a sensor control routine, executed in a sensor control circuit included in the block diagram shown in FIG. 2.

FIG. 3 shows a flowchart for a sensor control routine, executed in the sensor control circuit 70, being initiated by depressing the power switch button 24 which turns ON the power switch 74. Note, preferably, the depression of the power switch button 24, and therefore, the turning-ON of the power switch 74, is carried out after the camera is mounted on a tripod, which is positioned at a suitable location to photogrammetrically measure a desired area.

At step 301, the data-memory 72 is partially initialized, i.e. a storage area of the data-memory 72 for storing three-dimensional angular data of the camera is cleared.

At step 302, angular-movement data, derived from the angular-movements of the camera around the respective ψ-, χ- and ω-axes of the χ-ψ-ω three-dimensional coordinate system, are retrieved from the sensors 64, 66 and 68. For example, the retrieval of the angular-movement data is successively executed at time-intervals of 1 ms.

At step 303, it is determined whether a flag F is "0" or "1". At the initial stage, since F=0, the control proceeds from step 303 to 304, in which the angular-movement data, retrieved initially from the sensors 64, 66 and 68, are stored as initial data in the RAM of the sensor control circuit 70.

At step 305, the initial angular-movement data is corrected on the basis of the offset-distance data previously stored in the data-memory 72. Then, at step 306, the flag F is set to "1". Thereafter, the control returns to step 302. Note, the value "1" of the flag F is maintained until the power switch 74 is turned OFF by depressing the power switch button 24, i.e. the flag F is set to "0" by turning OFF the power switch 74.

After the time of 1 ms has elapsed at step 302, angular-movement data, derived from angular-movements of the camera around the respective ψ-, χ- and ω-axes of the χ-ψ-ω three-dimensional coordinate system, are again retrieved from the sensors 64, 66 and 68. Then, the control proceeds from step 302 to step 307, via step 303 (F=1), in which the retrieved angular-movement data are stored in the RAM of the sensor control circuit 70.

At step 308, three-dimensional angular data are calculated on the basis of the previous angular-movement data or corrected initial angular-movement data and the newest angular-movement data, stored in the RAM of the sensor control circuit 70. Then, at step 309, the calculated three-dimensional angle data are stored as data [AD] in the data-memory 72. Thereafter, the control returns from step 309 to step 302. Namely, the three-dimensional angular data [AD] are renewed every time 1 ms has elapsed.

Figure 4:
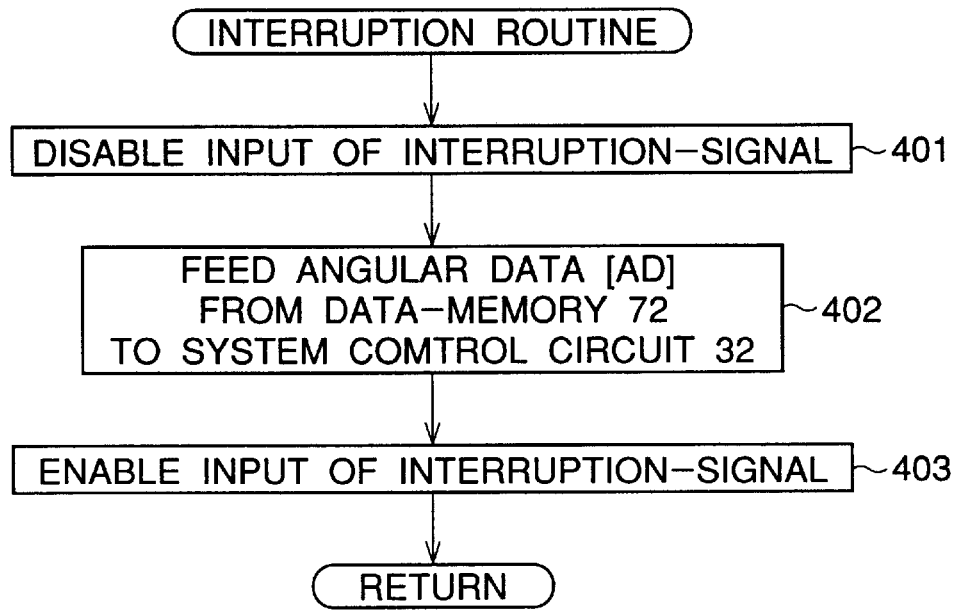
FIG. 4 is a flowchart of an interruption routine, executed in the sensor control circuit of FIG. 2.

FIG. 4 shows a flowchart for an interruption routine executed in the sensor control circuit 70. The execution of the interruption routine is initiated by an interruption-signal outputted from the system control circuit 32 to the sensor control circuit 70 during a photographing operation of the camera.

At step 401, as soon as a given interruption-signal is outputted from the system control circuit 32 to the sensor control circuit 70, an input of further interruption-signals to the sensor control circuit 70 is disabled. Namely, since the system control circuit 32 has a common output port for outputting interruption-signals to various control circuits included in the camera, the sensor control circuit 70 must be protected from the input of other interruption-signals after the necessary interruption-signal is once inputted from the system control circuit 32 to the sensor control circuit 70.

At step 402, the angular data [AD] are read from the data-memory 72, and are fed from the sensor control circuit 70 to the system control circuit 32.

At step 403, an input of an interruption-signal to the sensor control circuit 70 is enabled, and thus the sensor control circuit 70 is able to receive an output of an interruption-signal from the system control circuit 32 during a next photographing operation.

Figure 5:
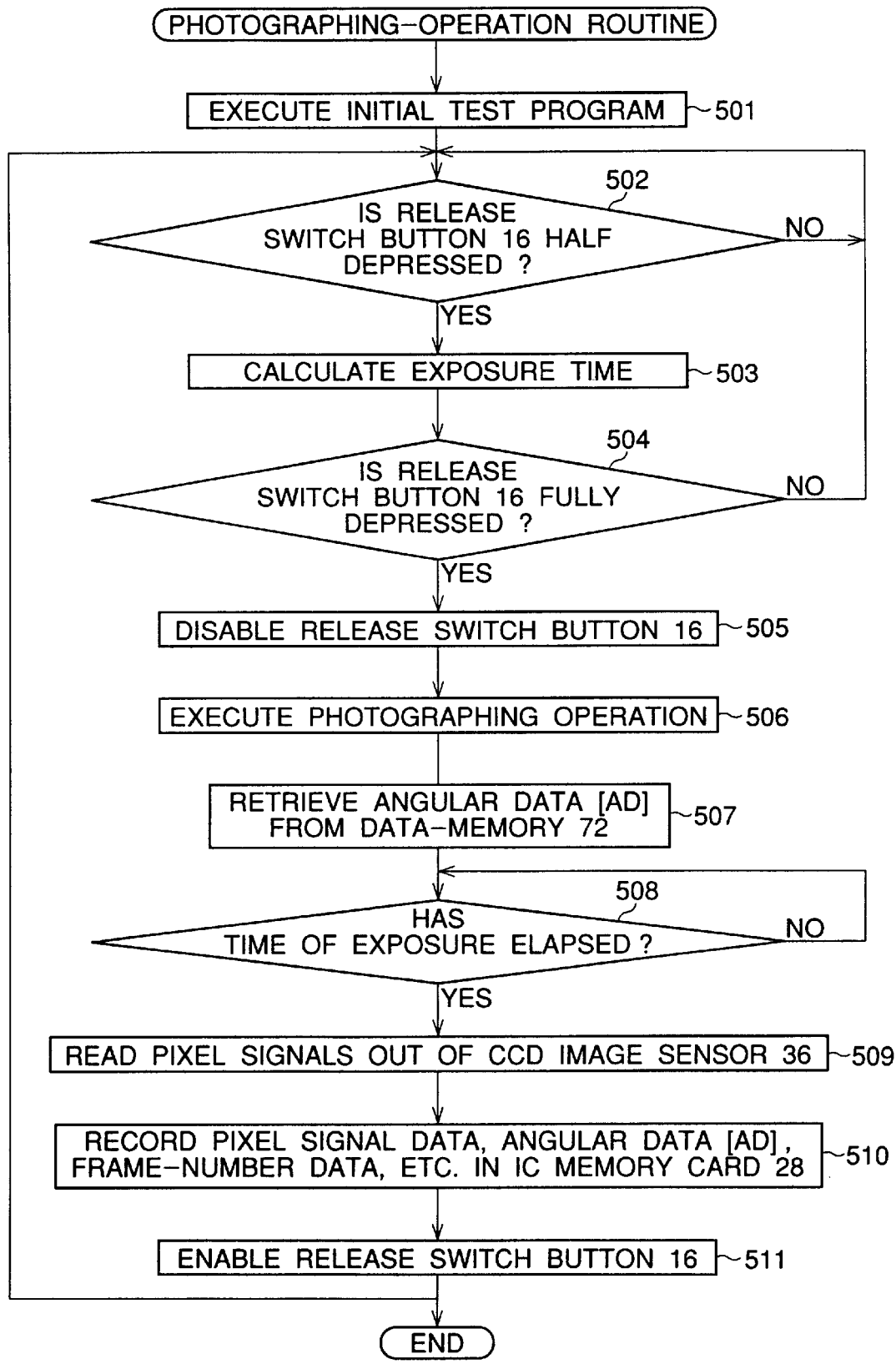
FIG. 5 is a flowchart of a photographing-operation routine, executed by the electronic still video camera shown in FIGS. 1 and 2.

FIG. 5 shows a flowchart for a photographing-operation routine, executed in the system control circuit 32, being also initiated by depressing the power switch button 24 which turns ON the power switch 74.

At step 501, an initial test program is executed to determine whether or not various functions of the camera can be properly performed. If any one of the functions of the camera is improper, a message, warning that the camera operation is irregular, is displayed on the LCD panel 20.

At step 502, it is determined whether or not the release switch button 16 is half depressed, thereby turning ON the photometry-sensor switch 76. The determination of half-depression of the release switch button 16 is repeatedly executed at time-intervals of, for example, 1 ms.

When it is confirmed that the release switch button 16 is half depressed, the control proceeds to step 503, in which a time of exposure or a time of electric charge accumulation is calculated based upon an output signal of the photometry sensor 46.

Then, at step 504, it is determined whether or not the release switch button 16 is fully depressed. Unless the release switch button 16 is fully depressed after being half-depressed, the control returns from step 504 to step 502. Note, the determination of full-depression of the release switch button 16 is also repeatedly executed at time-intervals of, for example, 1 ms.

When it is confirmed that the release switch button 16 is fully depressed, thereby turning ON the release switch 78, the control proceeds from step 504 to step 505, in which the release switch button 16 is disabled.

At step 506, a photographing operation is executed. In particular, an aperture size of the diaphragm 34 is adjusted by the iris driver circuit (not shown), under control of the exposure control circuit 44, based upon the output signal of the photometry sensor 46. The quick return mirror 38 is then subsequently rotated upward, from the down-position to the up-position. Thus, the light-receiving area of the CCD area image sensor 36 is exposed to light beams passing through the photographing optical system 12. Namely, an optical image, photographed by the photographing optical system 12, is focused and formed on the light receiving area of the CCD area image sensor 36, whereby the optical image is converted into a frame of electrical pixel signals.

At step 507, the angular data [AD] are retrieved from the data-memory 72 via the sensor control circuit 70. Namely, the system control circuit 32 outputs an interruption-signal, so that the angular data [AD] are fed to the sensor control circuit 70, as mentioned above.

At step 508, it is determined whether or not a given time of exposure (i.e. a time of electric charge accumulation) for converting the optical image into electrical pixel signals, by the CCD area image sensor 36, has elapsed. As soon as the time of exposure has elapsed, the quick return mirror 38 is returned from the up-position to the down-position.

At step 509, the frame of pixel signals are read out of the image sensor 36, are amplified by the amplifier 50, are converted to digital pixel signals by the A/D converter 52, and are processed by the image processing circuit 54, before being temporarily stored in the memory 56.

At step 510, the pixel signals are outputted from the memory 56 to the memory-card driver circuit 58, by which the outputted pixel signals are stored as a frame of pixel data in the IC memory card 28. At this time, the angular data [AD] are also stored, along with frame-number data and other information data, in the IC memory-card 28.

Figure 6:
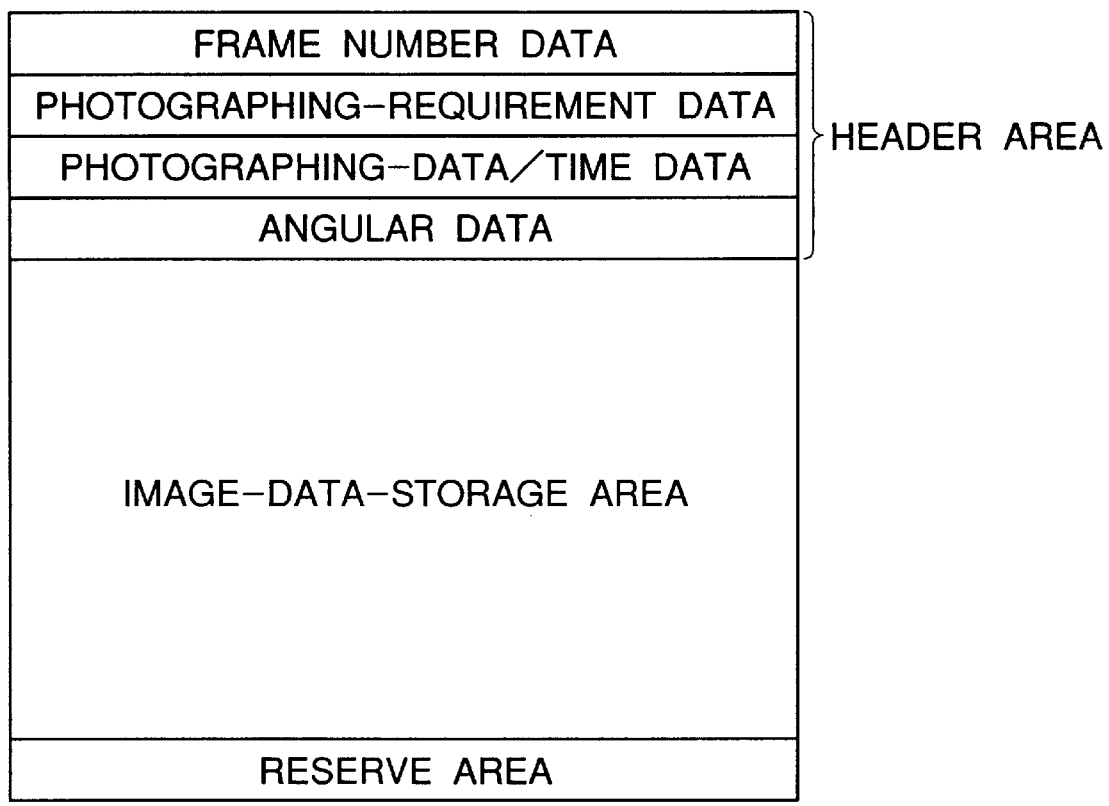
FIG. 6 is a conceptual schematic view showing an example of a format of an IC memory card, which can be loaded in the electronic still video camera shown in FIGS. 1 and 2.

As conceptually shown in FIG. 6, a memory area of the IC memory card 28 is formatted so as to be divided into a header area and an image-data-storage area. The frame of pixel data is stored in the image-data-storage area, and the angular data [AD], the frame-number data and other information data, such as photographing-requirement data, photographing-date/time data and so on, are stored in the header area. Also, as shown in FIG. 6, the memory area of the IC memory card 28 may include a reserve area.

After the pixel data, the angular data [AD], the frame-number data and other information data are stored in the IC memory card 28, the control proceeds to step 511, in which the release switch button 16 is enabled. Thereafter, the control returns to step 502, and is ready for a next photographing operation.

Figure 7:
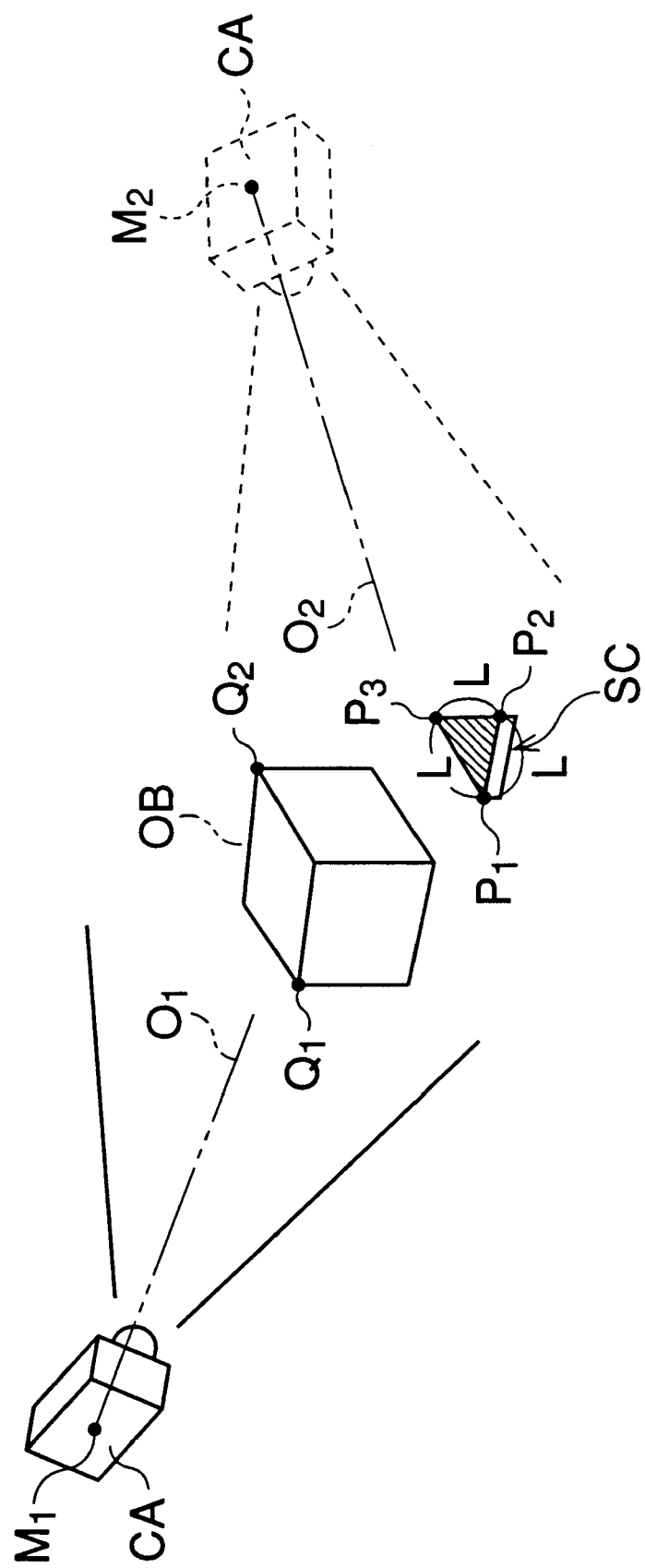
FIG. 7 is a conceptual perspective view showing the measurement system according to the present invention.

FIG. 7 conceptually shows a photogrammetric measurement system, using the camera as mentioned above. In this drawing, a cubic object OB is situated at a spot to be photogrammetrically measured, and a standard measurement scale SC is placed beside the cubic object OB. The standard measurement scale SC and the cubic object OB are photographed from two different directions by the camera, indicated by reference CA. Namely, as shown in FIG. 7, the standard scale SC and the cubic object OB are photographed by the camera CA placed at a first photographing position $M_1$, shown by a solid line, and are then photographed by the camera CA placed at a second photographing position $M_2$, shown by a broken line. At the first photographing position $M_1$, an optical axis of the camera CA is indicated by reference $O_1$, and, at the second photographing position $M_2$, the optical axis of the camera CA is indicated by reference $O_2$.

Note, each of the first and second photographing positions $M_1$ and $M_2$ may be defined as a back principal point of the photographing optical system 12 of the camera CA.

In the example shown in FIG. 7, the standard measurement scale SC is shaped as an equilateral-triangular plate member, and the apexes of the equilateral-triangular plate member are defined as three reference points $P_1$, $P_2$ and $P_3$. The sides of the equilateral triangle, defined by the reference points $P_1$, $P_2$ and $P_3$, have a predetermined length of L, which is utilized as a standard measurement length. Also, in FIG. 7, the equilateral triangle defined by the reference points $P_1$, $P_2$ and $P_3$ is shown as a hatched area, and this hatched area is utilized as a reference plane.

Note, three respective cone-shaped markers, which are identical to each other, may be positioned at suitable locations, in place of the standard measurement scale SC. In this case, a distance between two apexes of the cone-shaped markers is previously measured, for example, with a measuring tape, and is set as the standard measurement length. Also, a plane, defined by the three apexes of the cone-shaped markers, is utilized as the reference plane.

Figure 8:
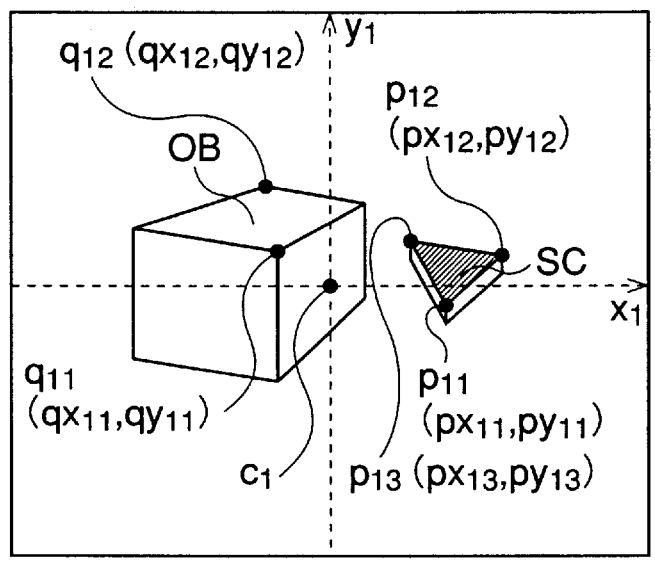
FIG. 8 is a conceptual view showing a picture photographed at a first photographing position in the measurement system of FIG. 7.

FIG. 8 shows a first picture photographed by the camera CA at the first photographing position $M_1$. As is apparent from this drawing, an $x_1$-$y_1$ rectangular coordinate system is defined on the first picture, and an origin $c_1$ of the $x_1$-$y_1$ coordinate system is at the photographed center of the first picture. In this coordinate system, the reference points $P_1$, $P_2$ and $P_3$ are represented by coordinates $p_{11}(px_{11}, py_{11})$, $p_{12}(px_{12}, py_{12})$ and $p_{13}(px_{13}, py_{13})$, respectively.

Figure 9:
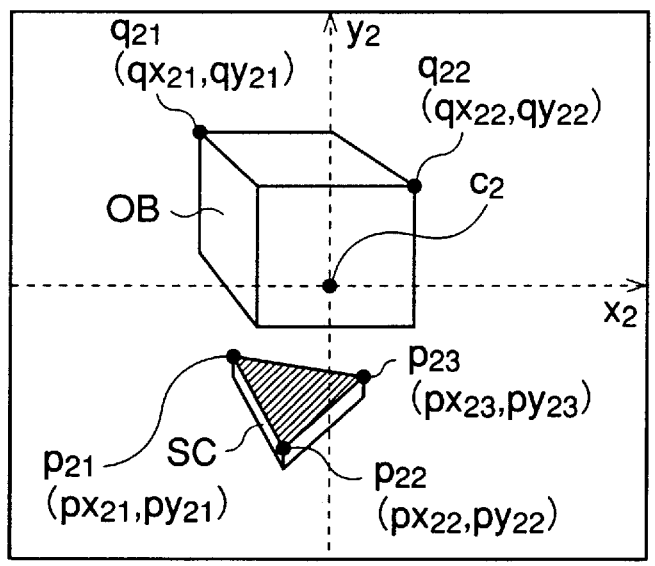
FIG. 9 is a conceptual view showing another picture photographed at a second photographing position in the measurement system of FIG. 7.

FIG. 9 shows a second picture photographed by the camera CA at the second photographing position $M_2$. As is apparent from this drawing, an $x_2$-$y_2$ rectangular coordinate system is defined on the second picture, and an origin $c_2$ $_{of\ the\ x2}$-$y_2$ coordinate system is at the photographed center of the second picture. In this coordinate system, the reference points $P_1$, $P_2$ and $P_3$ are represented by coordinates $p_{21}(px_{21}, py_{21})$, $p_{22}(px_{22}, py_{22})$ and $p_{23}(px_{23}, py_{23})$ respectively.

Figure 10:
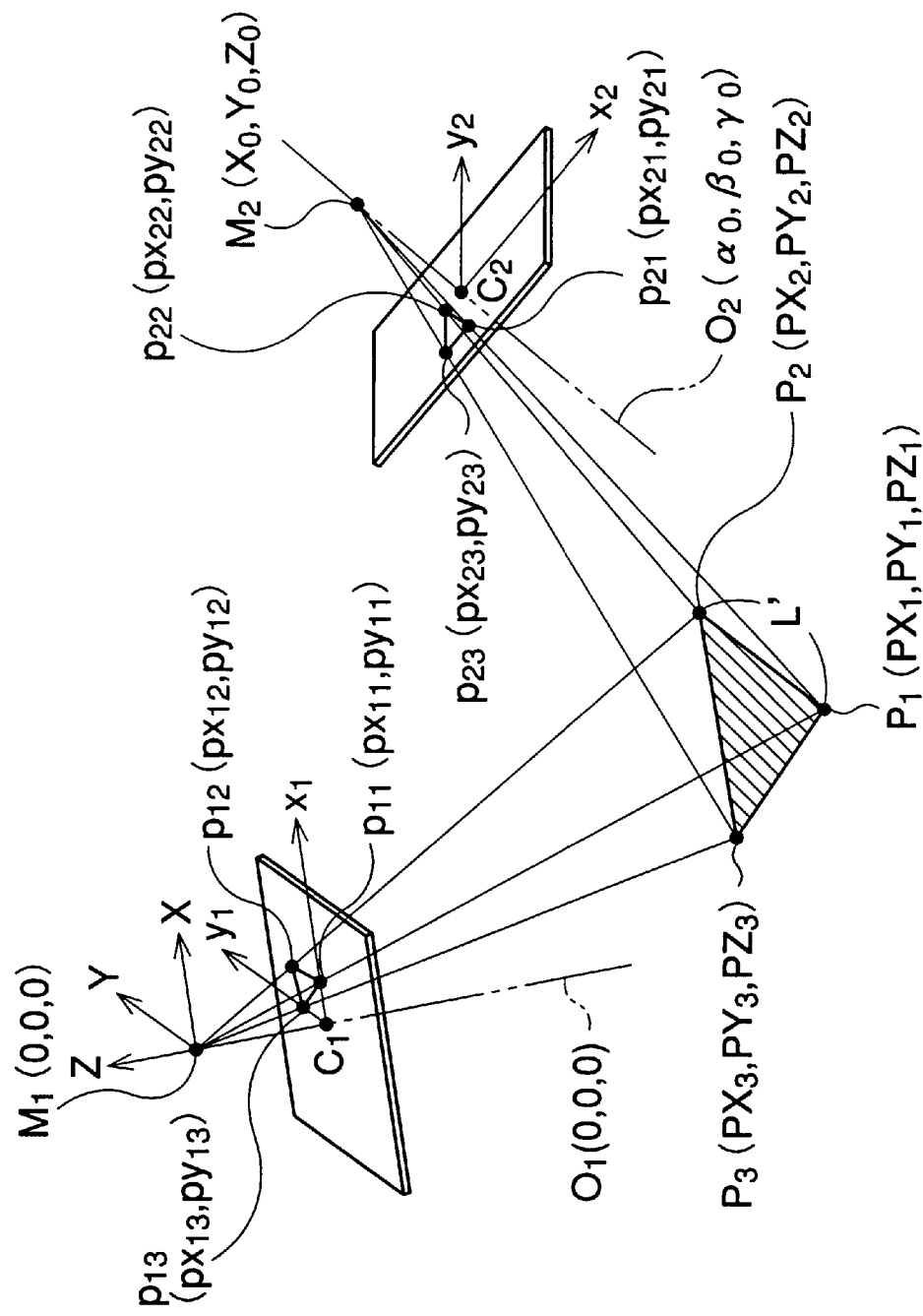
FIG. 10 is a conceptual view showing a relative-positional relationship between the standard scale and the first and second pictures from FIGS. 8 and 9, respectively.

FIG. 10 shows a relative-positional three-dimensional relationship between the standard scale SC, the camera CA, and the first and second pictures. In this case, the standard scale SC is relatively reproduced on the basis of the first and second pictures placed at the first and second photographing positions $M_1$ and $M_2$, but a size of the standard scale SC is also relative. Thus, a length of the sides of the equilateral triangle, defined by the reference points $P_1$, $P_2$ and $P_3$, is indicated by L'.

In order to calculate the three-dimensional coordinates of the cubic object OB, it is necessary to define an X-Y-Z three-dimensional coordinate system, as shown in FIG. 10, and the reference points $P_1$, $P_2$ and $P_3$ of the standard scale SC, recorded on each of the first and second pictures, must be positionally determined with respect to this second three-dimensional coordinate system.

As shown in FIG. 10, an origin of the X-Y-Z three-dimensional coordinate system is at the first photographing position $M_1$. Namely, the first photographing position $M_1$ is represented by the origin coordinates (0, 0, 0) of the X-Y-Z three-dimensional coordinate system. Also, a Z-axis of the X-Y-Z three-dimensional coordinate system coincides with the optical axis $O_1$ of the camera CA, placed at the first photographing position $M_1$, represented by angular coordinates (0, 0, 0). The second photographing position $M_2$ is represented by coordinates $(X_0, Y_0, Z_0)$, and the optical axis $O_2$ of the camera CA, placed at the second photographing position $M_2$, is represented by angular coordinates $(\alpha_0, \beta_0, \gamma_0)$. Namely, the optical axis $O_2$ of the camera CA defines angles of $\alpha_0$, $\beta_0$ and $\gamma_0$ with the X-axis, Y-axis and Z-axis of the X-Y-Z three-dimensional coordinate system, respectively.

The reference points $P_1$, $P_2$ and $P_3$ of the standard scale SC are represented by three-dimensional coordinates $P_j(PX_j, PY_j, PZ_j)$ (j=1, 2, 3). As shown in FIG. 10, each of the reference points $[P_1(PX_1, PY_1, PZ_1), P_2(PX_2, PY_2, PZ_2)$ and $P_3(PX_3, PY_3, PZ_3)]$, the image point $[p_{11}(px_{11}, py_{11}), p_{12}(px_{12}, py_{12}), p_{13}(px_{13}, py_{13})]$ of the corresponding reference point recorded on the first picture, and the back principal point ($M_1$) of the camera CA, are aligned with each other on a straight axis. Similarly, each of the reference points $[P_1(PX_1, PY_1, PZ_1), P_2(PX_2, PY_2, PZ_2)$ and $P_3(PX_3, PY_3, PZ_3)]$, the image point $[p_{21}(px_{21}, py_{21}), p_{22}(px_{22}, py_{22}), p_{23}(px_{23}, py_{23})]$ of the corresponding reference point recorded on the second picture, and the back principal point ($M_2$) of the camera CA, are aligned with each other on a straight axis.

Accordingly, the three-dimensional coordinates $P_j(PX_j, PY_j, PZ_j)$ can be determined by the following collinear equations:

$$PX_j = (PZ_j - Z_0)\frac{a_{11}px_{ij} + a_{21}py_{ij} - a_{31}C}{a_{13}px_{ij} + a_{23}py_{ij} - a_{33}C} + X_0$$

$$PY_j = (PZ_j - Z_0)\frac{a_{12}px_{ij} + a_{22}py_{ij} - a_{32}C}{a_{13}px_{ij} + a_{23}py_{ij} - a_{33}C} + Y_0$$

$$(i = 1, 2; \quad j = 1, 2, 3)$$

Herein:

$a_{11}=\cos\beta*\sin\gamma$ $a_{12}=-\cos\beta*\sin\gamma$ $a_{13}=\sin\beta$ $a_{21}=\cos\alpha*\sin\gamma+\sin\alpha*\sin\beta*\cos\gamma$ $a_{22}=\cos\alpha*\cos\gamma+\sin\alpha*\sin\beta*\sin\gamma$ $a_{23}=-\sin\alpha*\sin\beta$ $a_{31}=\sin\alpha*\sin\gamma+\cos\alpha*\sin\beta*\cos\gamma$ $a_{32}=\sin\alpha*\cos\gamma+\cos\alpha*\sin\beta*\sin\gamma$ $a_{33}=\cos\alpha*\cos\beta$ Note that, in these equations, C indicates a principal focal length of the camera CA, which is defined as a distance between the back principal point ($M_1$) and the photographing center ($c_1$) of the first picture, and a distance between the back principal point ($M_2$) and the photographing center ($c_2$) of the second picture. Also note, i corresponds to a number of the pictures; and j corresponds to a number of the reference points $P_1$, $P_2$ and $P_3$ of the standard scale SC.

As already mentioned above, when the first picture has been photographed by the camera CA at the first photographing position $M_1$, image-pixel data of the first picture is stored, together with the angular data [AD], the frame-number data and other information data, in the IC memory card 28. In this case, the angular data [AD], derived from the $\chi$-$\psi$-$\omega$ three-dimensional coordinate system, may be represented by three-dimensional angular coordinates $(\alpha_1, \beta_1, \gamma_1)$.

Similarly, when the second picture has been photographed by the camera CA at the second photographing position $M_2$, image-pixel data of the second picture is stored, together with the angular data [AD], the frame-number data and other information data, in the IC memory card 28. In this case, the angular data [AD], derived from the $\chi$-$\psi$-$\omega$ three-dimensional coordinate system, may be represented by three-dimensional angular coordinates $(\alpha_2, \beta_2, \gamma_2)$.

Figure 11:
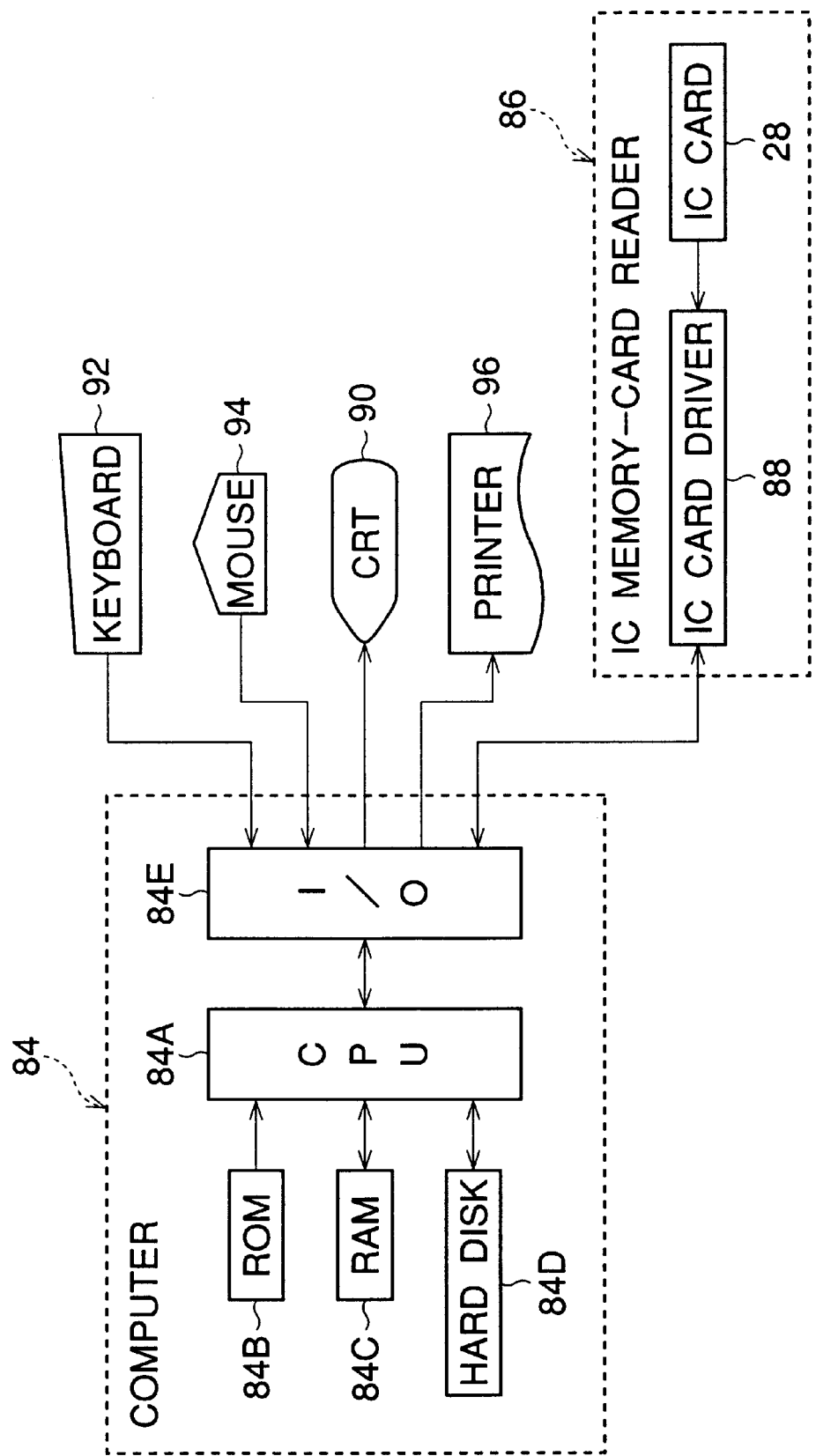
FIG. 11 is a block diagram of a coordinate-calculator system, in which a photogrammetric measurement is performed, according to the present invention.

FIG. 11 shows a block diagram of a coordinate-calculator system, in which the photogrammetric measurement, as mentioned above, is performed on the basis of the image-pixel data and the angular data stored in the IC memory card 28.

As shown in FIG. 11, the coordinate-calculator system is constructed as a computer system comprising a computer 84, which includes: a central processing unit (CPU) 84A; a read-only memory (ROM) 84B having an operating system program, a photogrammetric measurement program, constants, etc. stored therein; a random-access-memory (RAM) 84C for storing temporary data, temporary constants, etc.; a hard disk memory 84D for storing data resulting from calculations executed by the CPU 84A; and an input/output interface (I/O) 84E.

The computer system also comprises an IC memory card reader 86 connected to the computer 84, via the I/O 84E. The IC memory card reader 86 is provided with a slot for receiving the IC memory card 28, and includes an IC card driver 88 for reading a given frame of image-pixel data, angular data and other information data.

The computer system further comprises a monitor 90 for reproducing a photographed picture based on the frame of image-pixel data read from the IC memory card 28 and a survey map produced by the computer 84, a keyboard 92 for inputting various command signals and various data to the computer 84, a mouse 94 for manipulating a cursor displayed on the monitor 90, and a printer 96 for printing the survey map on a sheet of paper, if necessary.

Figure 12:
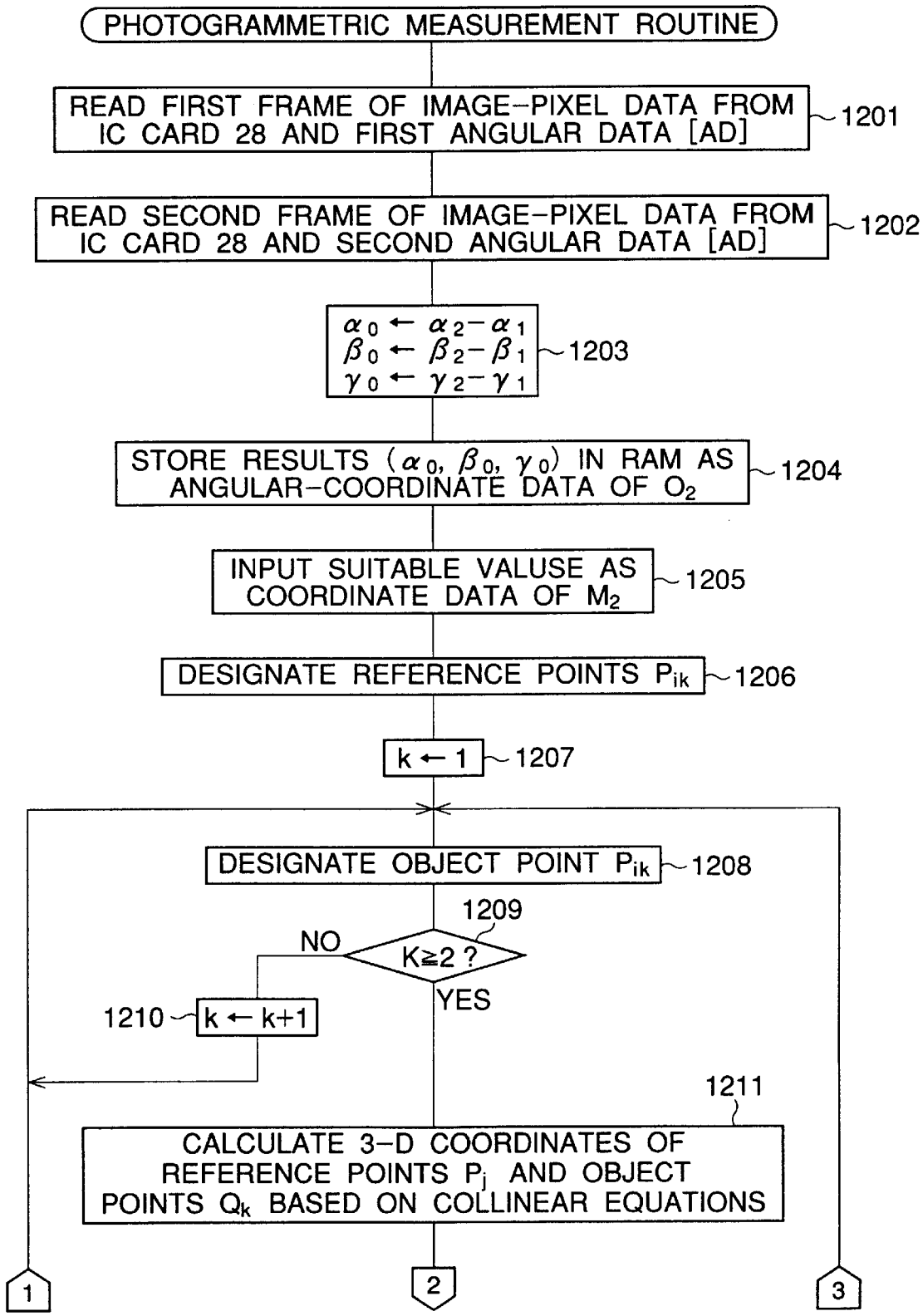
FIG. 12 is a part of a flowchart of a photogrammetric measurement routine for producing a survey map on the basis of the first and second pictures shown in FIGS. 8 and 9.

FIG. 12 shows a flowchart of a photogrammetric measurement routine, executed in the computer 84 shown in FIG. 11, in which a survey map is developed based upon the first and second pictures, shown in FIGS. 8 and 9. In executing the routine, a set of frame numbers, corresponding to the first and second pictures, is selected by an operator.

At step 1201, a first frame of image-pixel data and a first angle data [AD] are read from the IC memory card 28, by inputting the corresponding frame number of the chosen set via the keyboard 92. Thus, the first picture is reproduced and displayed on the monitor 90, as shown in FIG. 8, and the first angle data [AD], i.e. the three-dimensional angular coordinates $(\alpha_1, \beta_1, \gamma_1)$, are temporarily stored in the RAM 84C of the computer 84.

At step 1202, a second frame of image pixel data and a second angle data [AD] are read from the IC memory card 28, by inputting the other frame number of the chosen set via the keyboard 92. Thus, the second picture is reproduced and displayed on the monitor 90, as shown in FIG. 9, and the second angle data [AD], i.e. the three-dimensional angular coordinates ($\alpha_2$, $\beta_2$, $\gamma_2$), are temporarily stored in the RAM 84C of the computer 84.

At step 1203, on the basis of the angular data coordinates ($\alpha_1$, $\beta_1$, $\gamma_1$) of the camera, derived from the $\chi$-$\psi$-$\omega$ three-dimensional coordinate system and obtained at the first photographing position $M_1$, and the angular data coordinates ($\alpha_2$, $\beta_2$, $\gamma_2$) of the camera, derived from the $\chi$-$\psi$-$\omega$ three-dimensional coordinate system and obtained at the second photographing position $M_2$, the following calculations are executed:

$$\alpha_0 \leftarrow \alpha_2 - \alpha_1$$
$$\beta_0 \leftarrow \beta_2 - \beta_1$$
$$\gamma_0 \leftarrow \gamma_2 - \gamma_1$$

Namely, assuming that the first photographing position $M_1$ is situated at the origin of the X-Y-Z three-dimensional coordinate system, and that the optical axis $O_1$ of the camera coincides with the Z-axis of the X-Y-Z three-dimensional coordinate system (FIG. 10), the angular coordinates ($\alpha_0$, $\beta_0$, $\gamma_0$) of the optical axis $O_2$ of the camera are calculated, based on the values derived from the $\chi$-$\psi$-$\omega$ three-dimensional coordinate system.

At step 1204, the calculated results, i.e. the angular coordinate data ($\alpha_0$, $\beta_0$, $\gamma_0$) of the optical axis $O_2$, are temporarily stored in the RAM 84C of the computer 84.

At step 1205, as three-dimensional coordinate data ($X_0$, $Y_0$, $Z_0$) of the second photographing position $M_2$, suitable initial values (except for zero) are inputted to the computer 84 via the keyboard 92, and the three-dimensional coordinate data ($X_0$, $Y_0$, $Z_0$) are temporarily stored in the RAM 84C of the computer 84.

Note, of course, the three-dimensional coordinate data (0, 0, 0) of the first photographing position $M_1$ and the three-dimensional angular coordinate data (0, 0, 0) of the optical axis $O_1$ are previously stored in the RAM 84C of the computer 84.

At step 1206, the respective reference points $p_{ij}$($px_{ij}$, $py_{ij}$) are successively designated, on the first and second pictures displayed on the monitor 90, with the cursor manipulated by the mouse 94. Namely, the two sets of coordinates $p_{11}$($px_{11}$, $py_{11}$) and $p_{21}$($px_{21}$, $py_{21}$), the two sets of coordinates $p_{12}$ ($px_{12}$, $py_{12}$) and $p_{22}$($px_{22}$, $py_{22}$), and the two sets of coordinates $p_{13}$($px_{13}$, $py_{13}$) and $p_{23}$($px_{23}$, $py_{23}$) are also temporarily stored in the RAM 84C of the computer 84.

Note, it is possible to precisely designate the reference points $p_{ij}$($px_{ij}$, $py_{ij}$) with the cursor by the operator's manipulation of the mouse 94, because the apexes of the equilateral-triangular plate member or standard measurement scale SC are very conspicuous on the first and second pictures.

After the designation of the points $p_{ij}$($px_{ij}$, $py_{ij}$), at step 1206, the control proceeds to step 1207, in which a counter k is set to 1. Then, at step 1208, a suitable point $Q_{1(k=1)}$ of the cubic object OB is selected (FIG. 7), and image points $q_{ik}$ (FIGS. 8 and 9) of the selected point $Q_1$, displayed on the first and second pictures of the monitor 90, are designated with the cursor, manipulated by the mouse 94. Namely, the two sets of coordinates $q_{11}$($qx_{11}$, $qy_{11}$) and $q_{21}$($qx_{21}$, $qy_{21}$) of the image point $Q_1$ are temporarily stored in the RAM 84C of the computer 84.

Note, in the example shown in FIG. 7, although the point $Q_{1(k=1)}$ of the object OB is relatively conspicuous due to the cubic profile thereof, in reality, an object has a complex profile, and thus it is difficult to precisely designate a suitable point of the object on a set of pictures, as shown in FIGS. 8 and 9. Namely, an error in the designation of an object point with the cursor, by the operator's manipulation of the mouse 94, may frequently occur.

At step 1209, it is determined whether or not a count number of the counter k is more than 1. At the initial state, k=1, the control proceeds from step 1209 to step 1210, in which the count number of the counter k is incremented by 1. Then, the control returns to step 1208.

At step 1208, another suitable point $Q_{2(k=2)}$ of the cubic object OB is selected, and image points $q_{ik}$ (FIGS. 8 and 9) of the selected point $Q_2$ (FIG. 7), displayed on the first and second pictures of the monitor 90, are designated with the cursor, manipulated by the mouse 94. Namely, the two sets of coordinates $q_{12}$($qx_{12}$, $qy_{12}$) and $q_{22}$($qx_{22}$, $qy_{22}$) of the image point $Q_2$ are temporarily stored in the RAM 84C of the computer 84.

At step 1209, it is again determined whether or not a count number of the counter k is more than 1. At this stage, since k=2, the control proceeds from step 1209 to step 1211, in which the above-mentioned collinear equations are solved on the basis of the coordinate data stored in the RAM, so that the three-dimensional coordinates $P_j$($PX_j$, $PY_j$, $PZ_j$) of the reference points $P_1$, $P_2$ and $P_3$, the three-dimensional coordinates $Q_1$($QX_1$, $QY_1$, $QZ_1$) of the object point $Q_1$ and the three-dimensional coordinates $Q_2$($QX_2$, $QY_2$, $QZ_2$) of the object point $Q_2$ are estimated.

Note, as is apparent from the foregoing, the solving of the collinear equations is based upon the five designated points: the three reference points $P_j$ (j=1, 2, 3); and the two object points $Q_k$ (k=1, 2). The collinear equations should be solved on the basis of at least five designated points in order for the three-dimensional coordinates of the designated five points to be sufficiently approximated in the X-Y-Z three-dimensional coordinate system.

Figure 13:
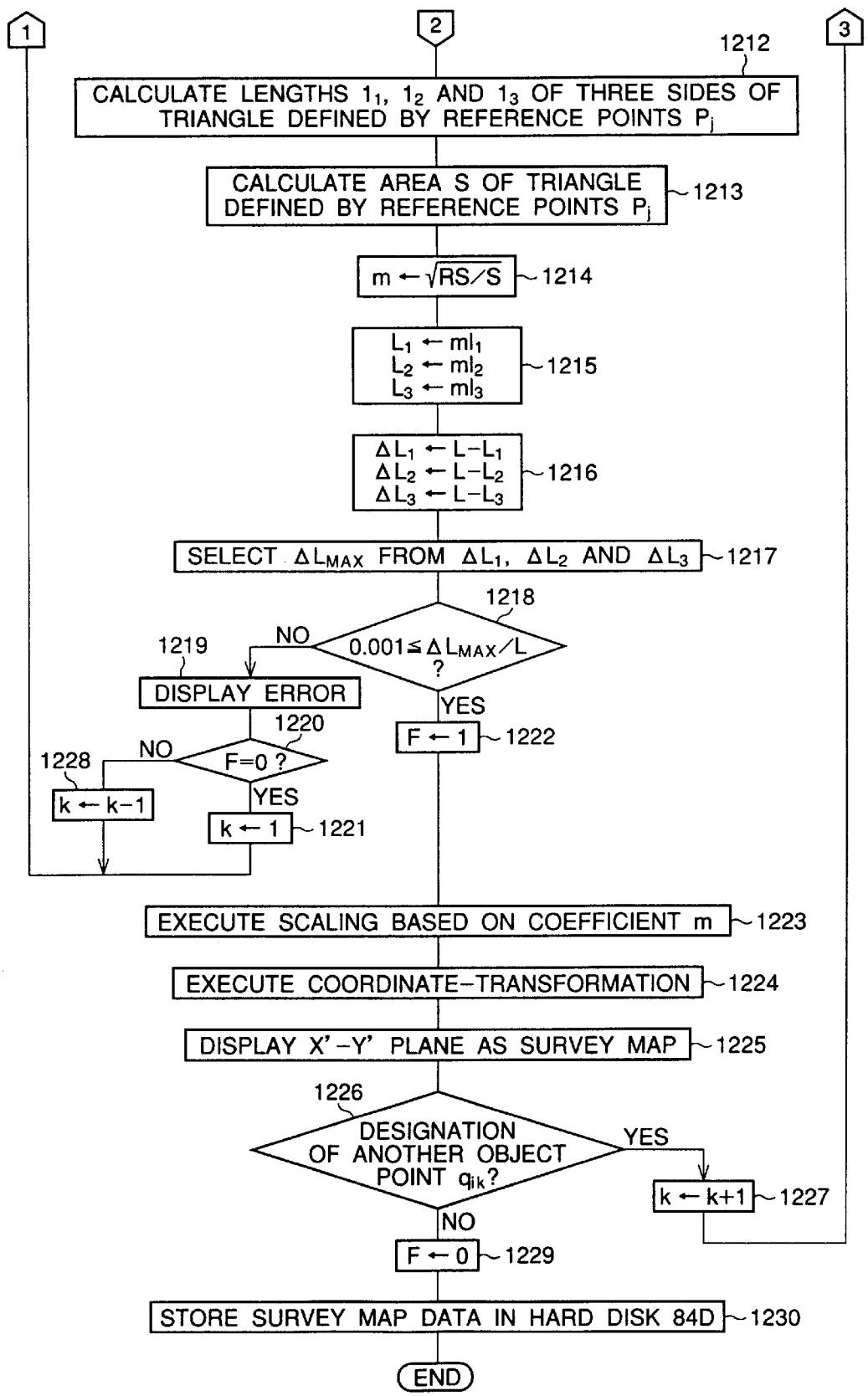
FIG. 13 is the remaining part of the flowchart of the photogrammetric measurement routine for producing the survey map on the basis of the first and second pictures shown in FIGS. 8 and 9.

As shown in FIG. 13, at step 1212, lengths $l_1$, $l_2$ and $l_3$ of the three sides of a triangular scale (SC), defined by the reference points $P_1$, $P_2$ and $P_3$ in the X-Y-Z three-dimensional coordinate system, are calculated on the basis of the determined three-dimensional coordinates $P_j$($PX_j$, $PY_j$, $PZ_j$) of the reference points $P_1$, $P_2$ and $P_3$. Note, reference $l_1$ represents a length of the side between the reference points $P_1$ and $P_2$; reference $l_2$ represents a length of the side between the reference points $P_2$ and $P_3$; and reference $l_3$ represents a length of the side between the reference points $P_3$ and $P_1$.

At step 1213, an area S of the triangular scale (SC), defined by the reference points $P_1$, $P_2$ and $P_3$ in the X-Y-Z three-dimensional coordinate system, is calculated on the basis of the calculated lengths $l_1$, $l_2$ and $l_3$ and the determined three-dimensional coordinates $P_j$($PX_j$, $PY_j$, $PZ_j$) of the reference points $P_1$, $P_2$ and $P_3$. Then, at step 1214, a coefficient m is calculated as follows:

$$m = \sqrt{RS/S}$$

Wherein, RS represents an actual area of the reference plane shown as the hatched area in FIG. 7.

Note, optionally, the coefficient m may be obtained by the following calculation:

$$m = (L/l_1 + L/l_2 + L/l_3)/3$$

At step 1215, the following calculations are executed:

$$L_1 \leftarrow ml_1$$

$$L_2 \leftarrow ml_2$$

$$L_3 \leftarrow ml_3$$

Namely, the calculated lengths $l_1$, $l_2$ and $l_3$ are converted, as an estimated actual length (L), into lengths $L_1$, $L_2$ and $L_3$ on the basis of the coefficient m, respectively.

At step 1216, differences between the actual length L and the converted lengths $L_1$, $L_2$ and $L_3$ are calculated as follows:

$$\Delta L_1 \leftarrow L - L_1$$

$$\Delta L_2 \leftarrow L - L_2$$

$$\Delta L_3 \leftarrow L - L_3$$

At step 1217, the maximum difference $\Delta L_{MAX}$ is selected from among the differences $\Delta L_1$, $\Delta L_2$ and $\Delta L_3$. Then, at step 1218, it is determined whether or not a ratio of $\Delta L_{MAX}$ to the actual length L is less than or equal to a value of 0.001.

If $\Delta L_{MAX}/L \leq 0.001$ (i.e., $\Delta L_{MAX}/L > 0.001$ is false), the control proceeds from step 1218 to step 1219, in which an error message is displayed on the monitor 90. For example, the message, that the designation of the object points $q_{1k}$ and $q_{2k}$ on the first and second pictures has been incorrectly performed, is displayed on the monitor 90. When the designation of the object points $q_{1k}$ and $q_{2k}$ is improper, the triangular scale (SC), defined by the reference points $P_1$, $P_2$ and $P_3$ in the X-Y-Z three-dimensional coordinate system, is distorted, and thus each of the converted lengths $L_1$, $L_2$ and $L_3$ departs from the limits of tolerances in regards to the actual length L.

In this embodiment, when the ratio of $\Delta L_{MAX}$ to the actual length L, representing the tolerance between the converted length and the actual length L, is at most 0.001, this tolerance is acceptable. In short, the three-dimensional coordinates $P_j(PX_j, PY_j, PZ_j)$ of the reference points $P_1$, $P_2$ and $P_3$ must be sufficiently approximated because the solving of the collinear equations is based upon the five designated points, as mentioned above. Nevertheless, when the ratio of $\Delta L_{MAX}$ to the actual length L is more than 0.001, this means that the designation of the object points $q_{1k}$ and $q_{2k}$ is unacceptable. Accordingly, the designation of the object points $q_{1k}$ and $q_{2k}$ on the first and second pictures with the cursor, by the operator's manipulation of the mouse 94, has to be reexecuted.

At step 1220, it is determined whether a flag F is "0" or "1". At this stage, since F=0, the control proceeds to step 1221, in which the counter k is set to 1. Then, the control returns to step 1208, in which the designation of the object points $q_{1k}$ and $q_{2k}$ on the first and second pictures with the cursor, by the operator's manipulation of the mouse 94, has to be tried again.

At step 1218, if $\Delta L_{MAX}/L \leq 0.001$ is true, the control proceeds from step 1218 to step 1222, in which the flag F is set to 1. Then, at step 1223, scaling is executed, using the coefficient m, to obtain a real spatial relationship between the determined three-dimensional coordinates $P_j(PX_j, PY_j, PZ_j)$ and $Q_1(QX_1, QY_1, QZ_1)$. Then, at step 1224, the X-Y-Z three-dimensional coordinate system is transformed into an X'-Y'-Z' three-dimensional coordinate system, defined as shown in FIG. 14.

Figure 14:
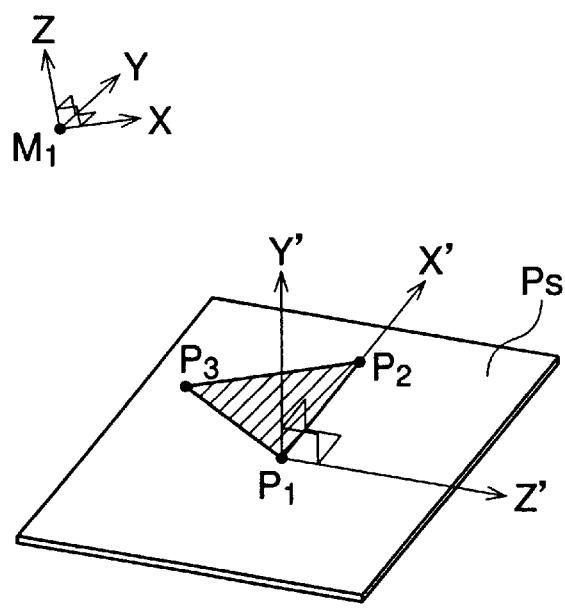
FIG. 14 is a conceptual perspective view showing a three-dimensional coordinate system for producing the survey map.

As is apparent from FIG. 14, an origin of the X'-Y'-Z' three-dimensional coordinate system is at the reference point $P_1$, and the X'-axis thereof is defined by the reference points $P_1$ and $P_2$. Also, The X'- and Z'-axes of the coordinate system define a plane Ps, which includes the hatched triangular plane area or reference area defined by the reference points $P_1$, $P_2$ and $P_3$. In the example of FIG. 14, although the origin of the X'-Y'-Z' three-dimensional coordinate system coincides with the reference point $P_1$, the origin may be at any location included in the plane Ps.

In FIG. 13, at step 1225, the X'-Z' plane Ps, on which the reference points $P_1$, $P_2$ and $P_3$ and the object points $Q_1$ and $Q_2$ are recorded, is displayed as a survey map on the monitor 90. Then, at step 1226, it is determined whether or not another set of points $q_{1k}$ and $q_{2k}$ should be designated with respect to the cubic object OB. When another set of points $q_{1k}$ and $q_{2k}$ should be further designated, i.e. when an insufficient number of sets of points $q_{1k}$ and $q_{2k}$, which are necessary to produce an acceptable survey map, have been designated, the control proceeds from step 1226 to step 1227, in which the counter k is incremented by 1.

Thereafter, the control returns to step 1208, in which the other set of object points $q_{1k}$ and $q_{2k}$ ($Q_{k=3}$) is designated on the first and second pictures with the cursor, by the operator's manipulation of the mouse 94.

At step 1209, it is determined whether or not a count number of the counter k is more than 1. At this stage, since k=3, the control proceeds from step 1209 to step 1211, in which the solving of the collinear equations is carried out on the basis of the six points: the three-dimensional coordinates $P_j(PX_j, PY_j, PZ_j)$ of the reference points $P_1$, $P_2$ and $P_3$, and the three-dimensional coordinates $Q_k(QX_k, QY_k, QZ_k)$ of the three object points $Q_k$ (k=3), whereby these six three-dimensional coordinates are approximately determined. Thereafter, the routine comprising steps 1212 to 1217 is executed in the same manner as mentioned above.

At step 1218, it is determined whether or not a ratio of $\Delta L_{MAX}$ to the actual length L is less than or equal to a value of 0.001.

If $\Delta L_{Max}/L > 0.001$ (ie., $\Delta L_{MAX}/L \leq 0.001$ is false) the control proceeds from step 1218 to step 1219, in which the message, that the designation of the object points $q_{1k}$ and $q_{2k}$ on the first and second pictures has been not properly carried out, is displayed on the monitor 90. Then, at step 1220, it is determined whether a flag F is "0" or "1". At this stage, since F=1, the control proceeds from step 1220 to step 1228, in which the counter number of the counter k is decremented by 1. Then, the control returns to step 1208, in which the designation of another set of object points $q_{1k}$ and $q_{2k}$ on the first and second pictures with the cursor, by the operator's manipulation of the mouse 94, has to be reperformed.

At step 1218, if $\Delta L_{MAX}/L \leq 0.001$ is true the routine comprising steps 1222 to 1226 is executed in the same manner as mentioned previously.

At step 1226, when a further set of points $q_{1k}$ and $q_{2k}$ need not be designated, i.e. when sufficient sets of $q_{1k}$ and $q_{2k}$, which are necessary to produce an acceptable survey map, have been designated, the control proceeds from step 1226 to step 1229, in which the flag F is set to 0. Then, at step 1230, data for producing the survey map is stored in the hard-disk 84D. Thus, the routine is completed.

Note, if necessary, the survey map, based on the respective data, is printed on a sheet of paper by the printer 96.

In the embodiment as mentioned above, if the standard measurement scale SC is horizontally placed, i.e. the standard reference plane (the hatched area shown in FIG. 7), defined by the reference points $P_1$, $P_2$ and $P_3$, is horizontal with respect to the Earth's surface, as angular coordinate data ($\alpha_0$, $\beta_0$, $\gamma_0$) of the optical axis $O_2$, suitable initial values (except for zero) are inputted to the computer 84 via the keyboard 92, similar to the three-dimensional coordinate data ($X_0$, $Y_0$, $Z_0$) of the second photographing position $M_2$. In short, as long as the standard measurement scale SC is horizontally placed, the approximate calculations, involved in the solving of the collinear equations, can be properly executed on the basis of the suitable angular coordinate data, and a distortion of the triangular scale (SC), defined by the approximated reference points $P_1$, $P_2$ and $P_3$, only results from the inaccurate designation of the object points on the first and second pictures.

However, if the standard measurement scale SC is inclined with respect to the Earth's surface, and if, as the suitable angular coordinate data of the optical axis $O_2$, the suitable initial values (except for zero) are inputted to the computer 84 via the keyboard 92, it is impossible to determine whether the distortion of the triangular scale (SC), defined by the approximated reference points $P_1$, $P_2$ and $P_3$, results from either the inaccurate designation of the object points on the first and second pictures or the slope of the standard measurement scale SC.

Of course, a location, to be photogrammetrically measured, on which the triangular scale (SC) is placed, is not necessarily precisely horizontal. Accordingly, it is preferable to use the camera with the angle-detecting system (FIG. 2) in the photogrammetric analytical measurement system of the present invention.

In the embodiment as mentioned above, although it is preferable that the standard measurement scale SC defines both the standard measurement length and the standard reference plane, the standard measurement length and the standard reference plane may be independently defined. For example, an triangular plate member may only be used to provide, as a standard reference plane, a plane defined by the three apexes thereof, and a pair of cone-shaped markers may only be used to provide a standard measurement length defined the apexes thereof. Further, a polygonal plate member, such as a quadrilateral plate member or a pentagonal plate member, may be used as a standard measurement scale. In this case, a distance between the two adjacent apexes of the polygonal plate member is used as a standard measurement length, and a plane, defined by the apexes thereof, is used as a standard reference plane.

When a primary solving of the above-mentioned collinear equations is based upon five conspicuous points, derived from a polygonal standard measurement scale and/or markers, such as cone-shaped markers, without designation of any object points, the approximate calculations, involved in the primary solving of the collinear equations, might be properly executed. In this case, designation of an object point is involved in a secondary solving of the collinear equations.

Finally, it will be understood by those skilled in the art that the foregoing description is of preferred embodiments of the system, and that various changes and modifications may be made to the present invention without departing from the spirit and scope thereof.

The present disclosure relates to subject matter contained in Japanese Patent Application No. 9-034330 (filed on Feb. 3, 1997) which is expressly incorporated herein, by reference, in its entirety.

What is claimed is:

1. A photogrammetric analytical measurement system for producing a survey map on the basis of respective first and second photographed pictures obtained at two different photographing positions, each of said first and second pictures including an object image to be recorded on said survey map and a standard measurement scale image for producing a proper relative size of said object image, said system comprising:

a monitor that displays said first and second pictures;

a designator that receives manual designations from an operator of a two-dimensional position on said first and second pictures displayed on said monitor;

a retriever that retrieves, as a set of two-dimensional position data, a first two-dimensional position received as a manual designation on said first picture by said designator, and a second two-dimensional position received as a manual designation on said second picture by said designator;

a first calculator that approximately calculates three-dimensional position data of said standard measurement scale image and said object image on the basis of plural sets of two-dimensional position data, retrieved by said retriever, corresponding to said standard measurement scale image and said object image, and received as manual designations by said designator;

a second calculator that calculates a dimensional parameter of said standard measurement scale image on the basis of the three-dimensional coordinate position data of said standard measurement scale image;

a converter that converts the dimensional parameter of said standard measurement scale image into an estimated actual dimensional parameter on the basis of a known actual dimensional parameter of said standard measurement scale image; and a determiner that determines whether or not a difference between said estimated actual dimensional parameter and said known actual dimensional parameter falls in a predetermined permissible range, whereby it is confirmed whether the manual designations of the two-dimensional positions received by said designator are not in error.

2. A photogrammetric analytical measurement system as set forth in claim 1, further comprising an indicator for warning that designation of the respective first and second two-dimensional positions, corresponding to said object image, by said designator should be repeated when determining by said determiner that the difference between said estimated actual dimensional parameter and said known actual dimensional parameter does not fall in said predetermined permissible range.

3. A photogrammetric analytical measurement system as set forth in claim 2, wherein said indicator comprises a part of a display area of said monitor, on which a warning message is displayed.

4. A photogrammetric analytical measurement system as set forth in claim 1, wherein said dimensional parameter is defined as a length derived from said standard measurement scale image.

5. A photogrammetric analytical measurement system as set forth in claim 4, wherein said standard measurement scale image has at least two conspicuous reference points, and said length is defined as a distance between the two conspicuous reference points of said standard measurement scale image.

6. A photogrammetric analytical measurement system as set forth in claim 1, wherein said standard measurement scale image has at least three conspicuous reference points, and at least one of the distances between said conspicuous reference points is defined as a known standard dimensional parameter.

7. A photogrammetric analytical measurement system as set forth in claim 6, wherein said conspicuous reference points define an equilateral triangle.

8. A photogrammetric analytical measurement system as set forth in claim 6, wherein said conspicuous reference points define a triangular reference plane on which said survey map is to be produced.

9. A photogrammetric analytical measurement system as set forth in claim 8, wherein the approximate calculation is executed by said first calculator, taking into consideration three-dimensional angular positions of a camera at said two photographing locations, when said triangular reference plane is inclined with respect to a horizontal plane of the Earth.

10. A photogrammetric analytical measurement system as set forth in claim 1, wherein an execution of the approximate calculation by said first calculator is based upon five sets of two-dimensional position data, retrieved by said retriever, corresponding to said standard measurement scale image and said object image.

11. A photogrammetric analytical measurement method of producing a survey map on the basis of respective first and second photographed pictures obtained at two different photographing positions, each of said first and second pictures including an object image to be recorded on said survey map and a standard measurement scale image for producing a proper relative size of said object image, said method comprising the steps of:

displaying said first and second pictures on a monitor;

receiving a manual designation from an operator of a two-dimensional position on said first and second pictures displayed on said monitor;

retrieving, as a set of two-dimensional position data, a first two-dimensional position, received as a manual designation on said first picture by said designator, and a second two-dimensional position, received as a manual designation on said second picture by said designator;

performing approximate calculation to determine three-dimensional position data of said standard measurement scale image and said object image on the basis of plural sets of two-dimensional position data, retrieved by said retriever, corresponding to said standard measurement scale image and said object image, and received as a manual designation by said designator;

performing a calculation to determine a dimensional parameter of said standard measurement scale image on the basis of the three-dimensional coordinate position data of said standard measurement scale image;

converting the dimensional parameter of said standard measurement scale image into an estimated actual dimensional parameter on the basis of a known actual dimensional parameter of said standard measurement scale image; and determining whether or not a difference between said estimated actual dimensional parameter and said known actual dimensional parameter falls in a predetermined permissible range, whereby it is confirmed whether the manual designations of the two-dimensional positions received by said designator are not in error.

12. A photogrammetric analytical measurement method as set forth in claim 11, further comprising the step of warning that designation of the respective first and second two-dimensional positions, corresponding to said object image, by said designator should be repeated when determining that the difference between said estimated actual dimensional parameter and said known actual dimensional parameter does not fall in said predetermined permissible range.

13. A photogrammetric analytical measurement method as set forth in claim 12, wherein a warning message is displayed on a part of a display area of said monitor.

14. A photogrammetric analytical measurement method as set forth in claim 11, wherein said dimensional parameter is defined as a length derived from said standard measurement scale image.

15. A photogrammetric analytical measurement method as set forth in claim 14, wherein said standard measurement scale image has at least two conspicuous reference points, and said length is defined as a distance between the two conspicuous reference points of said standard measurement scale image.

16. A photogrammetric analytical measurement method as set forth in claim 11, wherein said standard measurement scale image has at least three conspicuous reference points, and at least one of the distances between said conspicuous reference points is defined as a known standard dimensional parameter.

17. A photogrammetric analytical measurement method as set forth in claim 16, wherein said conspicuous reference points define an equilateral triangle.

18. A photogrammetric analytical measurement method as set forth in claim 16, wherein said conspicuous reference points define a triangular reference plane on which said survey map is to be produced.

19. A photogrammetric analytical measurement method as set forth in claim 18, wherein said approximate calculation is executed, taking into consideration three-dimensional angular positions of a camera at said two photographing locations, when said triangular reference plane is inclined with respect to a horizontal plane of the Earth.

20. A photogrammetric analytical measurement method as set forth in claim 11, wherein an execution of the approximate calculation is based upon five sets of two-dimensional position data, corresponding to said standard measurement scale image and said object image.

* * * * *